(12) United States Patent
Bowers et al.

(10) Patent No.: US 8,621,083 B2
(45) Date of Patent: Dec. 31, 2013

(54) SYSTEM AND METHOD FOR MULTICASTING THROUGH A LOCALIZED COMPUTER NETWORK

(75) Inventors: Richard D. Bowers, Roseville, CA (US); Donald J. Viola, Rocklin, CA (US); Kevin D. Hutler, Foresthill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2398 days.

(21) Appl. No.: 10/439,417

(22) Filed: May 15, 2003

(65) Prior Publication Data

US 2004/0230664 A1    Nov. 18, 2004

(51) Int. Cl.
*G06F 15/16* (2006.01)
(52) U.S. Cl.
USPC ............ 709/227; 709/204; 709/208; 709/238
(58) Field of Classification Search
USPC .................................. 709/204, 208, 227, 238
See application file for complete search history.

(56) References Cited

U.S. PATENT DOCUMENTS

| | | | | |
|---|---|---|---|---|
| 5,530,703 A * | 6/1996 | Liu et al. | ........................ | 370/255 |
| 5,570,366 A * | 10/1996 | Baker et al. | .................... | 370/312 |
| 5,940,391 A * | 8/1999 | Malkin et al. | ................. | 370/390 |
| 6,006,267 A * | 12/1999 | Nguyen et al. | ................ | 709/227 |
| 6,331,983 B1 * | 12/2001 | Haggerty et al. | ............. | 370/400 |
| 7,054,902 B2 * | 5/2006 | Toporek et al. | ................ | 709/203 |
| 2001/0025377 A1 * | 9/2001 | Hinderks | ....................... | 725/109 |
| 2004/0022278 A1 * | 2/2004 | Thomas et al. | ................ | 370/537 |
| 2005/0044142 A1 * | 2/2005 | Garrec et al. | ................. | 709/204 |

OTHER PUBLICATIONS

SS7/IP Interworking Tutorial—Signaling, http://www.pt.com/tutorials/iptelephony/tutorial_voip_signaling.html, 4 pages.
VoIP based Audio Broadcasting System, Aug. 2002, AddPac Technology, R & D Center, pp. 1-12.

* cited by examiner

*Primary Examiner* — Mohamed Ibrahim

(57) ABSTRACT

A system and method is provided for sending a multicast broadcast through a localized computer network that restricts multicast broadcasts. The system includes a dynamic multicast slave that is located within the localized computer network. The dynamic multicast slave is configured to receive a data stream broadcast via a point-to-point connection. A multicast socket is included for the dynamic multicast slave, and the multicast socket is configured to transmit a multicast data stream to the localized computer network based on the data stream received by the dynamic multicast slave. An internal multicast client is located within the localized computer network, and configured to receive the multicast data stream from the dynamic multicast slave.

22 Claims, 2 Drawing Sheets

SYSTEM AND METHOD FOR MULTICASTING THROUGH A LOCALIZED COMPUTER NETWORK

FIELD OF THE INVENTION

The present disclosure relates generally to multicasting into computer networks that restrict multicast broadcasts.

BACKGROUND

Nearly everyone with a relatively fast Internet connection has experienced streaming audio and video, whether by listening to a favorite music station, watching a news report, or accessing similar streaming content. However, streaming media is not just for entertainment. With the help of multicast technology, a company can broadcast corporate messages, training classes, or meetings directly to employees' desktops.

Examples of many-to-many applications include conferencing (video, audio, and whiteboard sharing), collaborative document sharing, interactive distance learning, and virtual reality. Other specific uses for multicast can include the real-time distribution of weather, stocks, telemetry, and remote sensing data. In addition, file distribution can be multicast such as software updates, database mirrors, and web caching. Multicast technology can even be used for cryptographic key or seed value distribution, network management, system configuration, and similar operations.

Streaming content is generally distributed to the desktop in one of two ways: point-to-point unicast or multicast. Unicast streaming is the method employed by World Wide Web and FTP servers, where data is sent as a separate stream from the source to each user who requests it. This method works in situations where each user wants different content and not many people want the same content at the same time.

With unicast streaming, the server capacity and size of a sender's network pipe determine the number of receivers that the sender can accommodate. Unicast also uses considerable bandwidth on receiving networks that have multiple listeners. From a programming standpoint, it is not easy to send duplicated data to many individual destinations simultaneously. A simple round-robin algorithm is insufficient because of the latency in processing a long list of recipients. With real-time data such as video and audio, many datagrams must be sent back-to-back to avoid the jitter (interpacket delays) that can disrupt the media.

Delivering the same streaming content to thousands of users via unicast is impractical because the necessary bandwidth between the originating server and the destination routers can be cost-prohibitive. Since many receivers of broadcast information get the same datastreams, these limitations and adverse effects are unnecessary. Much of this overhead can be avoided by using multicast, rather than unicast, for streaming media.

Multicast allows a content provider to send a single data stream to a single address, and then the downstream network routers subsequently distribute the data stream to as many receivers as desired. Instead of broadcasting thousands of streams, the server sends out only one stream that is propagated among multiple users who want the content. Multicast requires no additional bandwidth on the part of the sender to add new receivers, because the network routers handle the multicast distribution that is derived from the single data stream.

Using multicast streaming means the bandwidth is decreased not only at the server but also across most of the network path. This is because the bandwidth that is transmitted across the network to the multicast router is just a single stream. The network segments that consume large bandwidth quantities are located between the multicast routers and the destination desktop receivers. Of course, there may be many desktop receivers on the same network which are all requesting the same stream.

Multicast relies on the multicast backbone, which is not a separate Internet backbone. The multicast backbone is an address space laid out on the existing Internet and intranet backbones. The multicast address space occupies the Class D address range or addresses between 224.0.0.0 and 239.255.255.255. Several addresses within the range are reserved. For example, 224.0.0.1 is reserved for all hosts connected directly to the local network and 224.0.0.2 is designated for routers on a local area network (LAN).

Multicast sessions are assigned a multicast group ID, which is essentially an IP address within the Class D range. A client may join as many multicast groups as desired and can leave the multicast groups at any time. The host's physical location is irrelevant, as is the number of members in a group. IP packets sent out by the hosts look like all other IP packets with the exception that the destination address is the group IP. As mentioned, the multicast routers then have the responsibility to distribute the multicast packets to all members of the group that are downstream. In other words, the multicast router will take the individual stream and duplicate the stream into a single stream for each subscriber.

A new multicast stream is first assigned an address within the Class D range. Any client that wishes to receive the stream places that stream's Class D IP address on whichever interface it uses for IP. Because all the clients or recipients of the stream have the same Class D address, the multicast is sent to one address and thus to many recipients.

Multicast routers depend on a group membership protocol, such as IGMP (Internet Group Management Protocol), to learn about the clients connected to the subnets. When a client wishes to join a group, it sends an IGMP message to the multicast router, indicating the session(s) the client wishes to receive. The multicast router then begins broadcasting the sessions requested to the member's subnet (i.e. client) and the member adds the group ID address to its interface to begin reception. Scalability increases as more members join because there is a greater chance of locating a multicast router on a nearby upstream network.

Multicast is useless unless the streams actually make it to their intended audience and that hinges on the routing. Multicast can use at least two spanning-tree technologies to get streaming media to its destinations: dense mode or sparse mode. Dense mode floods the network tree with a broadcast so that every branch receives the signal. Branches that do not have clients requesting the signal are then pruned from the broadcast on the fly. Sparse mode works in the opposite fashion. Only those branches with clients requesting the broadcast actually receive the stream. The request from the client goes up the network tree until a multicast connection is made between the client and server. Multicast broadcasts are typically announced like anything else, through e-mail or on a Web site.

Unfortunately, IP multicasting is not perfect. For multicasting to work, every router in a network path may need to be enabled to forward the multicast packets to clients or members. This poses significant problems on older corporate networks which have routers that do not support multicast. Moreover, requiring routers to be configured to receive multicasts can create major headaches for broadcasts across the public Internet. Not every ISP, extranet partner, or dial-up remote access server has multicast-enabled networks. Even when routers are multicast capable, not all Internet Service Providers (ISPs), corporations, businesses, or network system managers enable the multicast routing. Then, even if the routers are configured properly, the routers may support different versions of multicast.

A similar problem exists with firewalls. When a network's outside traffic is routed through a secure firewall, the multicast packets are not forwarded through the firewall. In addition, a firewall does not duplicate multicast packets when it receives them. Clients who reside behind a firewall will not be able to receive multicasts. Ethernet switches are another consideration. New switches support multicast but some older models change multicast into broadcasts, which can adversely affect the network performance.

In the past, some companies have setup RTP (Real-Time Transport Protocol) level relays called translators in order to send multicast streams past firewalls. In order to use such a system, two translators are installed and one translator is located on either side of the firewall or other protective network mechanism. The outside translator funnels all the multicast packets received through a secure connection to the translator inside the firewall. The translator inside the firewall sends them again as multicast packets to a multicast group that was previously restricted by the firewall.

Since the translator receives multiple multicast streams and then resends multiple multicast streams, the translator carries a significant load when a large number of clients behind the firewall join the multicast group. Another serious drawback of translators is that a translator is a separate computer that must be setup by the network administrators or IT staff. This means that all sites with a protected network or all sites with a firewall would have to install the translator. This may be prohibitively expensive because a dedicated translator includes expensive hardware and there is also a cost for a technician to install the hardware and software. Accordingly, cost and inconvenience may prevent widespread deployment of these translator boxes. Moreover, the use of a translator may not overcome the router problems that exist across the entire Internet.

SUMMARY OF THE INVENTION

The invention provides a system and method for sending a multicast broadcast through a localized computer network that restricts multicast broadcasts. The system includes a dynamic multicast slave that is located within the localized computer network. The dynamic multicast slave is configured to receive a data stream broadcast via a point-to-point connection. A multicast socket is included for the dynamic multicast slave, and the multicast socket is configured to transmit a multicast data stream to the localized computer network based on the data stream received by the dynamic multicast slave. An internal multicast client is located within the localized computer network, and configured to receive the multicast data stream transparently from either the original multicast broadcast or from the dynamic multicast slave.

DETAILED DESCRIPTION

Figure 1:
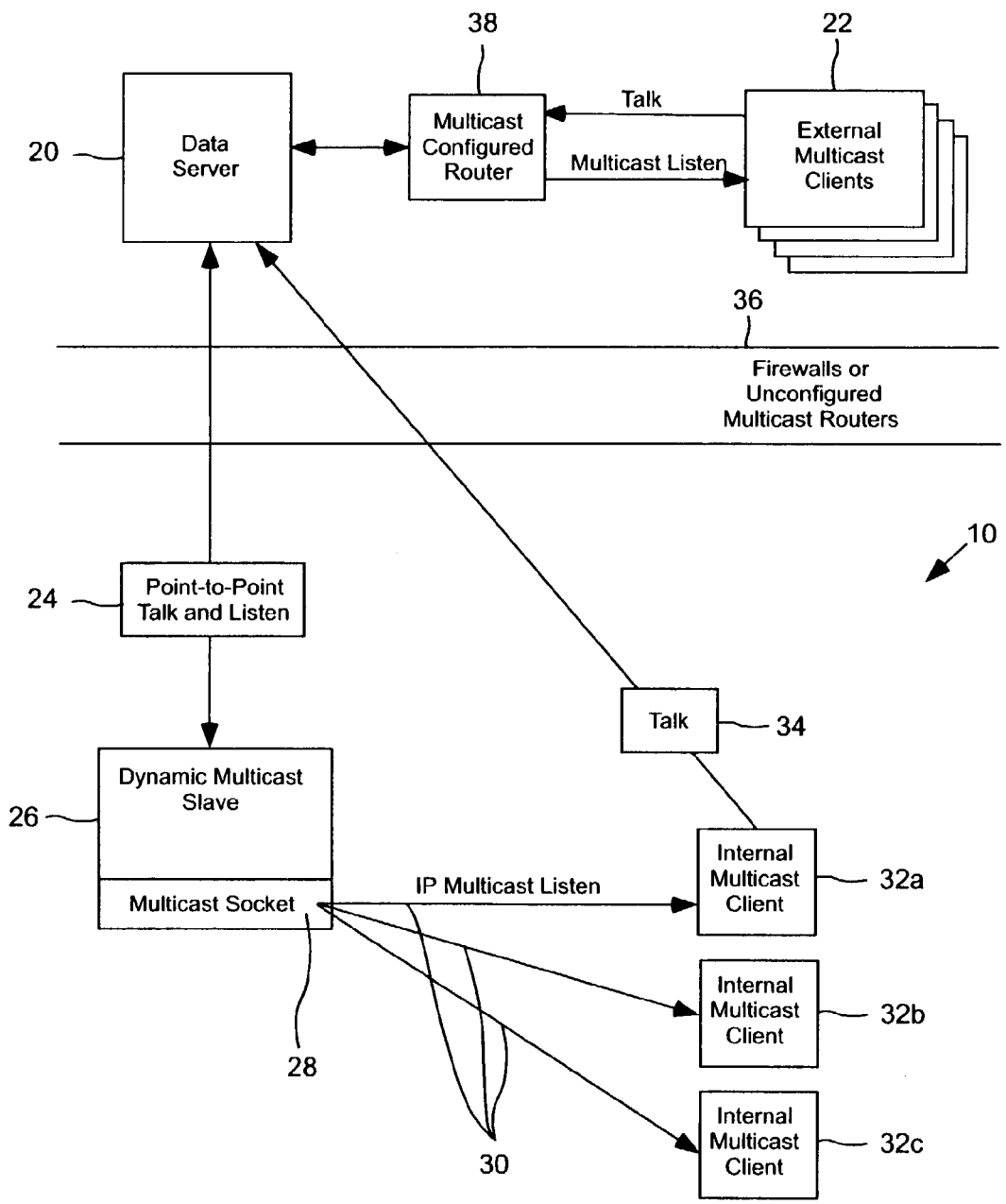
FIG. 1 is a block diagram illustrating a system for sending a multicast broadcast through a localized computer network that restricts multicast broadcasts in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Embodiments of the present invention provide a system and method that makes it practical to deploy multicast broadcasts throughout network infrastructures that cannot otherwise receive multicast broadcasts. Embodiments of the invention include a system and method for sending a multicast broadcast through a localized computer network that restricts multicast broadcasts.

One common way in which a localized computer network will restrict multicast broadcasts is the existence of a firewall or other network security component which restricts traffic and multicast broadcasts for security reasons. Another reason why a localized computer network may restrict multicast broadcasts is because the network routers do not have the capability or are not configured to transmit multicast information. The term localized computer network is generally defined in this description as a network that is located behind a firewall, unconfigured router or any similar component which blocks multicast broadcasts from outside networks. The localized computer network can be a local area network (LAN), wide area network (WAN), wireless network, or any other network that is logically or physically separated from an external public (e.g. the Internet) or private network in such a way that multicast broadcasts cannot be received.

In some embodiments, a dynamic multicast slave 26 is located within the localized computer network 10. The dynamic multicast slave may be configured to receive a broadcast data stream 24 via a point-to-point connection. This broadcast data stream may be received from a data server 20. The reason a point-to-point connection is used in this situation is because the firewall or unconfigured routers may typically allow a point-to-point connection to pass through to the dynamic multicast slave, whereas a multicast connection cannot generally pass through the firewalls or unconfigured routers. The point-to-point connection may be enabled to transmit data from the dynamic multicast slave back to the data server (talk) and to receive data for rebroadcast (listen). A point-to-point connection is generally defined as data that is sent as a separate stream from the data server to each client which requests it.

A multicast socket 28 is created for the dynamic multicast slave 26, and the multicast socket is configured to multicast the data stream 30 received by the dynamic multicast slave to the localized computer network. The multicast socket includes a multicast address and port. One or more internal multicast clients 32*a*, 32*b*, 32*c* are located within the localized computer network 10, and the internal multicast clients are configured to receive the multicast data streams from the dynamic multicast slave and its multicast socket.

In one embodiment of the invention, the dynamic multicast slave 26 broadcasts the multicast address and port of the multicast stream to the internal multicast clients. When an internal multicast client wants to join the multicast group, the internal multicast client may check to see if a dynamic multicast slave exists and if that dynamic multicast slave is already broadcasting the address and port of the current multicast session.

Alternatively, the data server 20 may be configured to send the address and port of the multicast socket 28 associated with the dynamic multicast slave 26 to the internal multicast clients 32a-c. This allows the internal multicast clients to try to listen to the dynamic multicast slave with the address and port received from the data server. In this embodiment, the internal multicast clients operate in a similar manner to external clients in that the internal multicast clients listen to the multicast broadcast on the given multicast address and port. Once the internal multicast clients have received the appropriate address and port, the internal multicast clients do not necessarily need to be aware that they are receiving the multicast broadcast from the dynamic multicast slave instead of the data server.

The dynamic multicast slave can be configured with delay logic to delay the transmission of the multicast data stream to the localized computer network until a query is received from at least one internal multicast client. If no multicast client is requesting the multicast data stream, then the dynamic multicast slave may determine that it is the only unit currently receiving the multicast on the localized computer network. Further, the dynamic multicast client broadcasts the multicast when a query is received from one or more internal multicast clients. Alternatively, the multicast slave may be configured to always transmit the multicast data just in case some other internal client needs the data.

In one embodiment of the invention, the dynamic multicast slave and the internal multicast clients each have software loaded to manage the multicasting and to determine which computing devices should be the dynamic multicast slave or internal multicast clients at any given time. Essentially, the same logic, program, or software may be contained in each client on the network but the specific circumstances of the multicast session may control which computing device is selected to be the dynamic multicast slave. This multicast software may also be included with a target application, such as a voice, audio, video or conferencing application.

An example of the dynamic nature of this system and method will now be presented. The first internal client on the localized computer network to join the multicast group will generally be nominated as the dynamic multicast slave. Any other internal multicast clients that join the multicast group (i.e., multicast session) will receive the multicast broadcast from the dynamic multicast slave. At some point, the initial dynamic multicast slave may terminate its involvement in the multicast session. In other words, the first dynamic multicast slave may stop broadcasting. In this situation, the dynamic multicast slave may or may not notify the internal multicast clients that it will stop broadcasting. However, the remaining internal multicast clients can then negotiate between themselves to determine which internal multicast client should take over as the dynamic multicast slave role.

The selection of the new dynamic multicast slave from the remaining internal multicast clients can be done in a number of ways. One method for selecting the new dynamic multicast slave is by enabling each internal multicast client to send a network broadcast requesting to be the dynamic multicast slave, and these broadcast requests will be staggered by random periods. This allows whichever internal multicast client broadcasts first to assume the role of the dynamic multicast slave. Other methods, such as priority ordering or network segmentation, can also be developed for allowing the internal multicast clients to negotiate with each other to determine which client will act as a dynamic multicast slave.

When the internal multicast clients want to send information back to the data server 20, the internal multicast clients use their own point-to-point talk stream 34 to transmit the desired "talk" information to the data server. Although only one talk stream is illustrated, each internal multicast client may have its own talk stream as needed. Each of the internal multicast clients can talk with the data server using a point-to-point connection, but they may only receive the multicast session (listen) through the dynamic multicast slave.

FIG. 1 also illustrates a multicast configuration where the data server 20 sends a single multicast data stream to one or more configured multicast routers 38 and these multicast routers receive and duplicate the stream into multiple broadcast streams for the external multicast clients 22. This illustrates the situation where Internet routers or local network routers are configured properly and no firewall is in place. Clients that are not behind any protective firewall or similar protective device may have direct access to the data server and use a specific protocol to talk to the server and listen to a multicast stream. Clients that are not protected may use UDP (User Datagram Protocol) to receive the multicast. In other words, the general difference (other than setup/initialization) between receiving standard UDP packets and multicast packets is the address range (Class D for multicast). In this way, multicasts provide an unlimited amount of listeners.

Providing a dynamic multicast slave in the present invention is valuable because it allows a multicast session to be sent to internal network clients in situations where a network is constrained or protected by firewalls, unconfigured routers, or other security devices. In addition, since the individual whose computer is being used as the dynamic multicast slave has asked to receive the multicast, this avoids possible security breaches because the dynamic multicast session cannot be initiated by someone outside of the protected network. In contrast, a translator system may be vulnerable to outside attacks.

Using a dynamic multicast slave is especially valuable where a multicast stream is desired to be provided to a corporation or other entity but it is not possible to check with the corporation's IT department to determine whether configured multicast routers are in place or whether the necessary elements are in place to allow multicast packets to negotiate past their firewalls. The multicast invention is able to pass through the barriers described, yet provide additional multicast advantages to the network. Not only is the load on the local network routers reduced but the multicast is delivered through the dynamic multicast slave which is likely to have unused processing power. This transfers part of the multicast load from the network servers and routers to the dynamic multicast slave.

Another benefit of the present invention is that the setup of the dynamic multicast slave does not require any user intervention because the setup happens in real-time when the multicast session starts. This is important because corporations face several hurdles or problems when they need to configure their firewall, routers, or dedicated internal translators to transmit a multicast broadcast. Specifically, it takes a significant amount of time to have a router or internal translator setup and configured properly and this means hours, days or weeks. This initial configuration may also include contacting the IT department of the given corporation or receiving written approval. The result is that someone who is behind a firewall or protected network cannot simply join a multicast group on the fly or join without a significant amount of setup. In addition, corporations are very reluctant to install additional pieces of software that bridge firewalls into their network. The reason for this is that any time additional software is installed in security systems, the new software creates the possibility of a security breach or weak spots for hackers to try to access.

Yet, another valuable result of the present invention is that the multicast setup may be transparent to the network and to users. The transparency is because the dynamic multicast slave uses a point-to-point connection. In addition, the setup may be transparent to users because the dynamic multicast slave and internal multicast clients take care of the connection details in the background without the users (or even the network) having to know anything about the setup details. This system transparency may reduce the setup load that would otherwise be placed on the network's routers or servers and transfers that load to the dynamic multicast slave.

Figure 2:
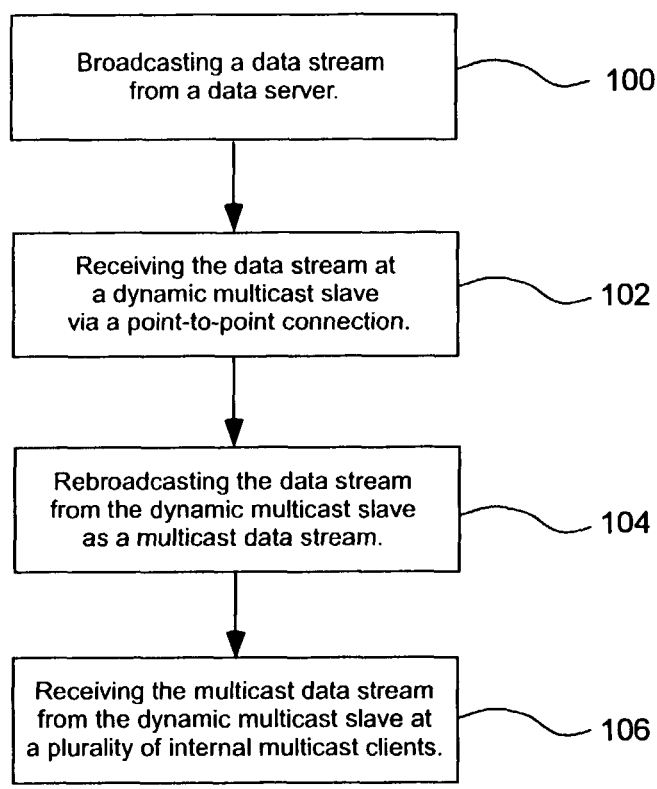
FIG. 2 is a flow chart illustrating an embodiment of a method for sending a multicast broadcast through a localized computer network.

Embodiments of the present invention include a method for sending a multicast broadcast into a localized computer network that restricts multicast broadcasts. FIG. 2 illustrates that the invention includes the operation of broadcasting a data stream from a data server in block 100. The step of broadcasting a data stream from a multicast data server may be common to all multicast broadcasts, but this step has been included to more clearly explain the method. Another operation is receiving the data stream at a dynamic multicast slave via a point-to-point connection in block 102. Once the dynamic multicast slave is connected to the multicast data stream, the dynamic multicast slave can continuously receive the data stream via the point-to-point connection.

The data stream is rebroadcast from the dynamic multicast slave as a multicast data stream in block 104. This rebroadcast takes place via a multicast socket that is created for the dynamic multicast slave. The multicast data stream can be received from the dynamic multicast slave at a plurality of internal multicast clients in block 106. The internal multicast clients may be clients located within the localized computer network which desire to receive the multicast session.

As discussed previously, the address and port of the multicast socket can be broadcast by the dynamic multicast slave to the internal multicast clients. Another option is to enable the data server to send the address and port when the internal multicast clients are in communication with the data server.

Whenever an internal multicast client joins a multicast session, each internal multicast client may be enabled to listen and determine whether a dynamic multicast slave is already broadcasting. If no multicast slave is broadcasting, then one of the internal multicast clients may assume the role of the dynamic multicast slave. As mentioned before, the dynamic multicast slave role can be selected by a negotiation between some or all of the multicast clients. Once a new dynamic multicast slave is selected, then the new dynamic multicast slave receives the point-to-point connection from the data server.

In another embodiment of the invention, if the dynamic multicast slave knows it is going to be removed from a session or stop broadcasting, then another selected internal multicast client may double up with the old dynamic multicast slave that will be leaving the multicast session. This way there is no break in the multicast broadcast and the newly selected dynamic multicast slave can take over as the previous slave leaves.

When the dynamic multicast client connects to the data server via a point-to-point connection, this point-to-point connection can be an HTTP connection, a SOCKS connection, direct IP, or any other connection through which the dynamic multicast client can receive the data stream from the data server. The present invention can be used to re-transmit multicast information such as voiceover IP (VoIP), radio stations, video broadcasts, white board sessions, or any other multicast. Users that are protected behind the firewall would otherwise have to connect to the data stream through individual point-to-point connections, which create a significant load on the data server and on the localized computer network's routers and servers.

The present invention is important because multicast is an efficient way to send data to multiple recipients. Efficient means that every network node receives a single data stream and that a single data stream is not wastefully duplicated at any point in the network, whether at the data servers, routers or client broadcasts. The approach of the present invention automatically minimizes the point-to-point connections that would otherwise be needed to transmit a multicast stream into a protected localized network.

Using the dynamic multicast slave also allows the present invention to rapidly create pockets or islands of computers that are involved in the multicast session. One point-to-point stream is sent to each pocket or island and then that point-to-point stream is converted to a multicast for the remaining computers within the island. The present invention helps corporations, customers and other entities that do not have time to configure or install multicast configured routers. It also avoids the problem of requiring corporations and entities to configure multicast routers when they are needed for a specific conference, telephone call, or other video presentation.

Prior multicast broadcast systems have typically used a control socket and a data socket. The control socket transmits control data and aids in determining that the multicast broadcast is functioning properly. The data socket is the connection which transmits the data stream to be received. The present system can avoid using a control socket through a number of methods. The internal multicast clients can recover automatically if the dynamic multicast slave fails and this reduces the need for a control socket. Alternatively, the dynamic multicast slave can broadcast a heartbeat ping with the data stream to allow the internal multicast clients to check that the dynamic multicast slave is alive regardless of whether or not data is being broadcast.

For example, the multimedia data may be an audio session. To minimize network traffic, the data server does not transmit audio packets containing silence (which can occur when a speaker pauses between sentences or between thoughts). When a multicast client stops receiving packets, it needs some reliable way to determine whether this is expected silence, or the network has stopped transmitting multicast packets for some reason. In some situations, a corporation's routers may have been configured to stop transmitting multicast packets when the network is congested. However, the data server can send out heartbeat multicast packets at a determined interval. If a client is listening via multicast and stops receiving audio packets, but still receives heartbeat packets, then the broadcast has not terminated. If the client stops receiving audio and heartbeat packets, the client may need to negotiate with other clients on the same local network for one client to take on the role of the dynamic multicast slave.

It is to be understood that the above-referenced arrangements are illustrative embodiments of the present invention. Numerous modifications and alternative embodiments can be devised. For example, one embodiment may be an article of manufacture comprising a computer usable medium having computer readable program code embodied therein.

What is claimed is:

1. A method for sending a multicast broadcast into a localized computer network that restricts multicast broadcasts, comprising:

configuring an internal multicast client as a dynamic multicast slave, wherein the multicast client is located within the localized computer network that is coupled to a multicast broadcast block operable to block multicast broadcasts into the localized computer network;

receiving a data stream at the dynamic multicast slave through the multicast broadcast block via a point-to-point connection;

rebroadcasting the data stream from the dynamic multicast slave as a multicast data stream within the localized computer network;

receiving the multicast data stream from the dynamic multicast slave at a plurality of internal multicast clients located within the localized computer network; and delaying the transmission of the multicast data stream from the dynamic multicast slave until a query is received from an internal multicast client.

2. The method as in claim 1, wherein rebroadcasting the data stream as the multicast data stream further comprises rebroadcasting the data stream as the multicast data stream within the localized computer network using a multicast socket for the dynamic multicast slave.

3. The method as in claim 2, further comprising sending an address and port of the multicast socket to the internal multicast clients from a data server.

4. The method as in claim 3, further comprising enabling each internal multicast client to receive the address and port and to listen to determine whether a dynamic multicast slave is already broadcasting.

5. The method as in claim 4, further comprising enabling each internal multicast client to become the dynamic multicast slave if another dynamic multicast slave is not currently broadcasting.

6. The method as in claim 1, further comprising transferring the multicast data stream from a current dynamic multicast slave that terminates communications by enabling a remaining internal multicast client to assume the role of the dynamic multicast slave and to broadcast the multicast data stream.

7. The method as in claim 6, further comprising selecting a new dynamic multicast slave from the internal multicast clients using broadcasts between the internal multicast clients with random timeout periods.

8. The method as in claim 1, further comprising sending a heartbeat ping from a data server to the internal multicast clients to notify the internal multicast clients that a broadcast has not terminated.

9. A system for sending a multicast broadcast through a localized computer network that restricts multicast broadcasts, comprising:

a first internal multicast client configured as a dynamic multicast slave and located within the localized computer network;

a multicast broadcast block connected to the localized computer network that is operable to block multicast broadcasts within the localized computer network;

wherein the dynamic multicast slave is configured to receive a data stream broadcast through the multicast broadcast block via a point-to-point connection;

a multicast socket connected to the dynamic multicast slave located within the localized computer network, the multicast socket being operable to transmit a multicast data stream within the localized computer network based on the data stream received by the dynamic multicast slave;

a second internal multicast client located within the localized computer network, configured to receive the multicast data stream from the dynamic multicast slave; and delay logic located in the dynamic multicast slave and configured to delay the transmission of the multicast data stream within the localized computer network until a query is received by at least one internal multicast client.

10. The system as in claim 9, further comprising a data server located outside of the localized computer network from which the data stream is broadcast to the dynamic multicast slave.

11. The system as in claim 10, wherein the data server is enabled to send an address and port of the multicast socket to a plurality of internal multicast clients via the point-to-point connection.

12. The system as in claim 11, wherein each internal multicast client is enabled to receive the address and port and to listen to determine whether a multicast slave is already broadcasting.

13. The system as in claim 9, wherein the multicast data stream can be transferred from a current multicast slave that has terminated communications by enabling a remaining internal multicast client to assume the role of the multicast slave and broadcast the multicast data stream.

14. The system as in claim 13, wherein a new multicast slave is selected from the remaining internal multicast clients using broadcasts with random timeout periods.

15. The system as in claim 9, wherein the multicast broadcast block comprises a firewall which restricts external multicast broadcasts from reaching internal multicast clients located within the localized computer network.

16. The system as in claim 9 wherein the multicast broadcast block comprises a network router which is configured to not allow external multicast broadcasts to reach internal multicast clients located within the localized computer network.

17. The system as in claim 9, wherein an internal multicast client is enabled to become the multicast slave if another multicast slave is not currently broadcasting.

18. A system for sending a multicast broadcast through a localized computer network that restricts multicast broadcasts, comprising:

a data server configured to broadcast a data stream;

a multicast broadcast block, connected to the localized computer network, that is operable to block multicast broadcasts into the localized computer network;

an internal multicast client located within the localized computer network that is operable as a dynamic multicast slave, wherein the dynamic multicast slave is configured to receive the broadcast data stream via a point-to-point connection that is not blocked by the multicast broadcast block;

a multicast socket coupled to the dynamic multicast slave, wherein the multicast socket is configured to multicast the data stream received by the dynamic multicast slave to the localized computer network;

a plurality of internal multicast clients located within the localized computer operable to receive the multicast data stream from the dynamic multicast slave; and delay logic located in the multicast slave and configured to delay the transmission of the multicast data stream within the localized computer network until a query is received by at least one internal multicast client.

19. The system as in claim 18, wherein the dynamic multicast slave broadcasts an address of the data stream to the plurality of internal multicast clients.

20. An article of manufacture, comprising:

a non-transitory computer readable medium having computer readable program code embodied therein for sending a multicast broadcast into a localized computer network that blocks multicast broadcasts, the computer readable program code in the article of manufacture comprising:

computer readable program code for receiving a data stream at an internal multicast client configured as a dynamic multicast slave via a point-to-point connection, wherein the dynamic multicast slave is located within the localized computer network configured to block multicast broadcasts;

computer readable program code for rebroadcasting the data stream from the dynamic multicast slave as a multicast data stream within the localized computer network;

computer readable program code for receiving the multicast data stream from the dynamic multicast slave at a plurality of internal multicast clients located within the localized computer network; and computer readable program code for delaying the transmission of the multicast data stream from the dynamic multicast slave until a query is received from an internal multicast client.

21. The article of manufacture as in claim 20, further comprising computer readable program code for sending the plurality of internal multicast clients an address of the multicast data stream from the dynamic multicast slave.

22. A system for sending a multicast broadcast through a localized computer network that blocks multicast broadcasts, comprising:

a data server means for broadcasting a data stream and an address and port of the data stream to the localized computer network;

an internal multicast client means configured as a dynamic multicast slave means located within the localized computer network;

a multicast broadcast block means connected to the localized computer network that blocks multicast broadcasts;

wherein the dynamic multicast slave means is for receiving the broadcast data stream from the data server means via a point-to-point connection through the multicast broadcast block means;

a multicast socket means connected to the dynamic multicast slave means located within the localized computer network, wherein the multicast socket means is for multicasting the data stream and the address and port of the data stream received by the dynamic multicast slave means to the localized computer network;

a plurality of internal multicast client means located within the localized computer network that cannot receive multicast broadcasts from the data server means through the multicast broadcast block, wherein the plurality of internal multicast client means are configured to receive the multicast data stream from the dynamic multicast slave means located within the localized network; and a delay logic means located in the dynamic multicast slave means, wherein the delay logic means is configured to delay a transmission of the multicast data stream until a query is received by at least one internal multicast client means.

* * * * *